(12) United States Patent
Gopalakrishnan et al.

(10) Patent No.: US 9,897,484 B1
(45) Date of Patent: Feb. 20, 2018

(54) MEASURING WIDEBAND SPECTRUM INFORMATION IN MOBILE DEVICES VIA AN INTEGRATED OPTICAL SYSTEM THAT USES MULTIPLE SPECTRAL SENSORS, MULTIPLE LIGHT SOURCES AND MEMS ACTUATION

(71) Applicant: Intel Corporation, Santa Clara, CA (US)

(72) Inventors: Manoj Gopalakrishnan, Bangalore (IN); Ramesh Pendakur, Gaston, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/279,573

(22) Filed: Sep. 29, 2016

(51) Int. Cl.
*G01N 21/25* (2006.01)
*G01J 3/02* (2006.01)
*G01J 3/10* (2006.01)
*G01J 3/18* (2006.01)
*G01J 3/28* (2006.01)

(52) U.S. Cl.
CPC .............. *G01J 3/021* (2013.01); *G01J 3/0272* (2013.01); *G01J 3/10* (2013.01); *G01J 3/18* (2013.01); *G01J 3/2803* (2013.01); *G01J 3/108* (2013.01)

(58) Field of Classification Search
CPC .. G01J 3/021; G01J 3/0272; G01J 3/10; G01J 3/18; G01J 3/2803; G01J 3/108
See application file for complete search history.

(56) References Cited

U.S. PATENT DOCUMENTS

| 2007/0194239 | A1 | 8/2007 | McCallister et al. |
| 2015/0051498 | A1* | 2/2015 | Darty ..................... A61B 5/447 600/477 |
| 2016/0202178 | A1 | 7/2016 | Acosta et al. |

FOREIGN PATENT DOCUMENTS

| JP | 2006208204 A | 8/2006 |
| JP | 2013539865 A | 10/2013 |
| JP | 2014126529 A | 7/2014 |

OTHER PUBLICATIONS

Gavin Perrella, "Texas Instruments DLP NIRscan Nano Evaluation Module (EVM) Optical Design Considerations", DLPA062, Jan. 2016, 8 pages, Texas Instruments Inc.
(Continued)

*Primary Examiner* — Tarifur Chowdhury
*Assistant Examiner* — Jamil Ahmed
(74) *Attorney, Agent, or Firm* — Jordan IP Law, LLC

(57) ABSTRACT

Systems, apparatuses and methods may provide for a light collector to capture an inbound optical signal and a plurality of detectors, wherein each detector is associated with a wavelength detection range that differs from one or more wavelength detection ranges associated with one or more remaining detectors in the plurality of detectors. Additionally, a microelectromechanical system (MEMS) device may include a plurality of mirrored columns, wherein each mirrored column is coated with a material that is associated with a wavelength reflection range that differs from one or more wavelength reflection ranges associated with one or more remaining mirrored columns in the plurality of mirrored columns. In one example, the MEMS device positions the plurality of mirrored columns to route the inbound optical signal to one or more of the plurality of detectors based on an input signal from a user input device.

21 Claims, 4 Drawing Sheets

(56) References Cited

OTHER PUBLICATIONS

International Search Report and Written Opinion for International Patent Application No. PCT/US2017/049093, dated Dec. 4, 2017, 22 pages.

* cited by examiner

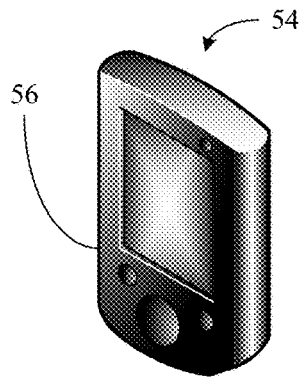

80 — Receive an input signal

82 — Activate, by a light controller, one or more of a plurality of light sources based on the input signal, wherein each light source is associated with a wavelength transmission range that differs from one or more wavelength transmission ranges associated with one or more remaining light sources in the plurality of light sources 84 — Activate, by a detector controller, one or more of a plurality of detectors based on the input signal, wherein each detector is associated with a wavelength detection range that differs from one or more wavelength detection ranges associated with one or more remaining detectors in the plurality of detectors 86 — Capture, by a light collector, an inbound optical signal 88 — Position, by a MEMS device, a plurality of mirrored columns to route the inbound optical signal to one or more of the plurality of detectors based on the input signal, wherein each mirrored column is coated with a material that is associated with a wavelength reflection range that differs from one or more wavelength reflection ranges associated with one or more remaining mirrored columns in the plurality of mirrored columns 90 — Analyze the inbound optical signal and generate an analysis result

FIG. 8

MEASURING WIDEBAND SPECTRUM INFORMATION IN MOBILE DEVICES VIA AN INTEGRATED OPTICAL SYSTEM THAT USES MULTIPLE SPECTRAL SENSORS, MULTIPLE LIGHT SOURCES AND MEMS ACTUATION

TECHNICAL FIELD

Embodiments generally relate to spectrometers. More particularly, embodiments relate to technology that measures wideband spectrum information in mobile devices via an integrated optical system that uses multiple spectral sensors, multiple light sources and microelectromechanical system (MEMS) actuation.

BACKGROUND

Spectrometers may provide a contactless way to analyze materials. For example, a spectrometer may include a light source that illuminates objects and a sensor that measures the intensity of reflected light from the objects at different wavelengths. A single sensor, however, may not be sufficient to cover a wide spectrum of light. Accordingly, conventional spectrometers may be limited in the range of objects that can be detected. While multiple sensors and external high intensity light sources might increase flexibility, such an approach may result in a bulkier system that is not suitable for handheld form factors.

BRIEF DESCRIPTION OF THE DRAWINGS

The various advantages of the embodiments will become apparent to one skilled in the art by reading the following specification and appended claims, and by referencing the following drawings, in which:

FIG. 7 is a perspective view of an example of the handheld system of FIG. 6 according to an embodiment; and FIG. 8 is a flowchart of an example of a method of operating a spectrometer apparatus according to an embodiment.

DESCRIPTION OF EMBODIMENTS

Figure 1A:
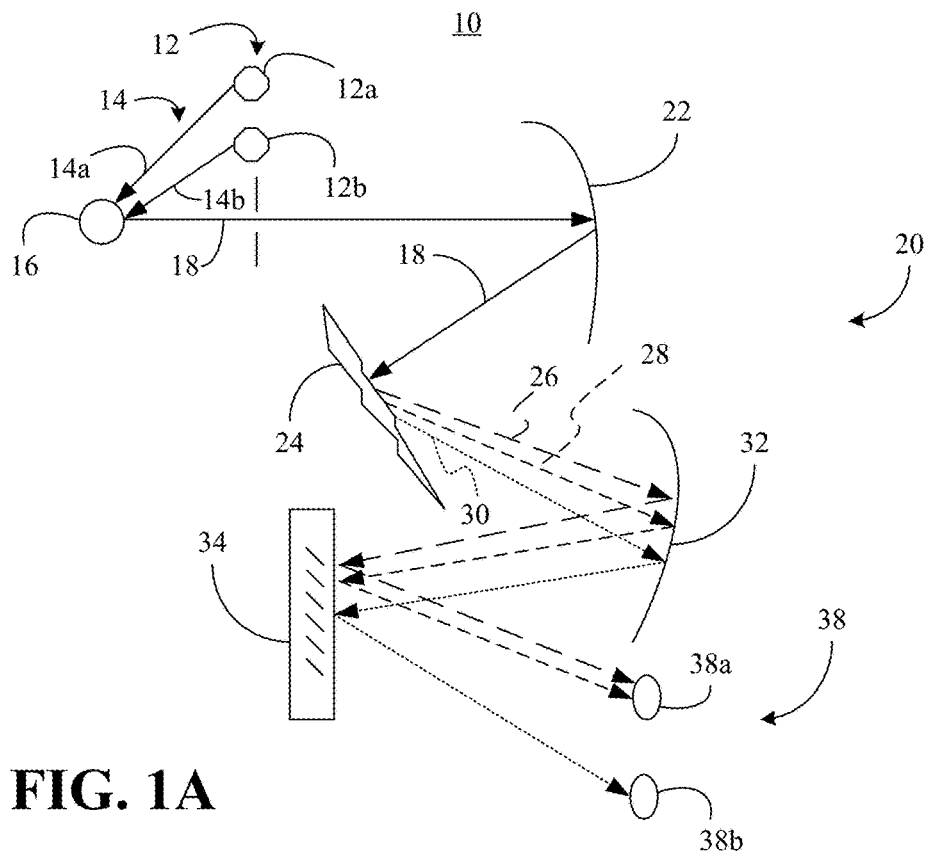
FIGS. 1A and 1B are plan views of examples of spectrometer apparatuses according to embodiments.

Turning now to FIG. 1A, a spectrometer apparatus 10 is shown in which a plurality of light sources 12 (12a, 12b) generate an outbound optical signal 14 (14a, 14b). The light sources 12 may generally be associated with wavelength transmission ranges that differ from one another. For example, a first light source 12a may include a light emitting diode (LED) array that generates a first portion 14a of the outbound optical signal 14 in the ultraviolet (UV) to visible range of the light spectrum. By contrast, a second light source 12b might include, for example, an infrared (IR) projector that generates a second portion 14b of the outbound optical signal 14 in the IR range of the light spectrum. Other types of light sources 12 may also be used. As will be discussed in greater detail, the light sources 12 may be individually activated based on an input signal originating from, for example, a user input (UI) device (not shown) of a mobile system (e.g., having a handheld form factor) that includes the spectrometer apparatus 10.

In the illustrated example, the outbound optical signal 14 illuminates an object 16, which absorbs some of the outbound optical signal 14 and reflects some of the outbound optical signal 14, depending on the material properties of the object 16. Light reflected from the object 16 may be captured as an inbound optical signal 18 by a light collector 20, wherein the wavelength content of the inbound optical signal 18 may be used to identify, characterize and/or classify the object 16. The light collector 20 may include a collimation mirror 22 that redirects the inbound optical signal 18 to a diffraction grating element 24. The illustrated diffraction grating element 24 separates/splits the inbound optical signal 18 into light of different wavelengths. For example, the diffraction grating element 24 might split the inbound optical signal 18 into a first light component 26 (e.g., first set of wavelengths), a second light component 28 (e.g., second set of wavelengths) and a third light component 30 (e.g., third set of wavelengths). A focus mirror 32 may in turn reflect the light components 26, 28, 30 to a microelectromechanical system (MEMS) device 34.

Figure 2:
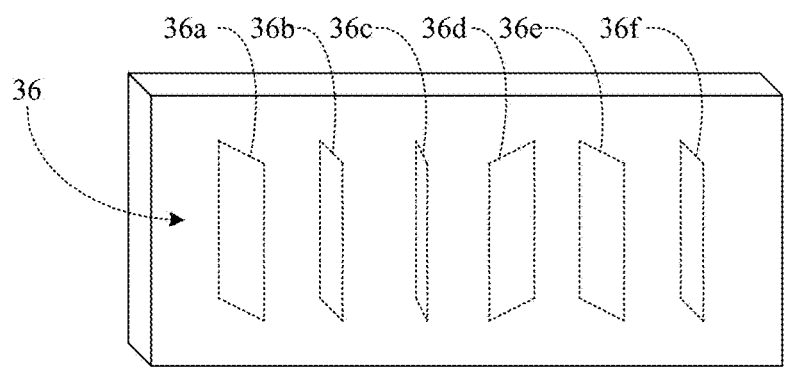
FIG. 2 is a perspective view of an example of a plurality of mirrored columns according to an embodiment.

With continuing reference to FIGS. 1A and 2, the illustrated MEMS device 34 includes a plurality of mirrored columns 36 (36a-36f) that may be individually tilted to certain angles that will result in the light components 26, 28, 30 being routed to one or more of a plurality of detectors 38 (38a, 38b) or away from the plurality of detectors 38. Each mirrored column 36 may be coated with a material (e.g., metal) that is associated with a specific/unique wavelength reflection range. For example, FIG. 3 includes a chart 40 demonstrating that protected gold may be associated with a first wavelength reflection range, protected silver may be associated with a second wavelength reflection range, enhanced aluminum may be associated with a third wavelength reflection range, protected aluminum may be associated with a fourth wavelength reflection range, UV aluminum may be associated with a fifth wavelength reflection range, deep UV (DUV) aluminum may be associated with a sixth wavelength reflection range, etc., wherein the wavelength reflection ranges differ from one another.

Figure 3:
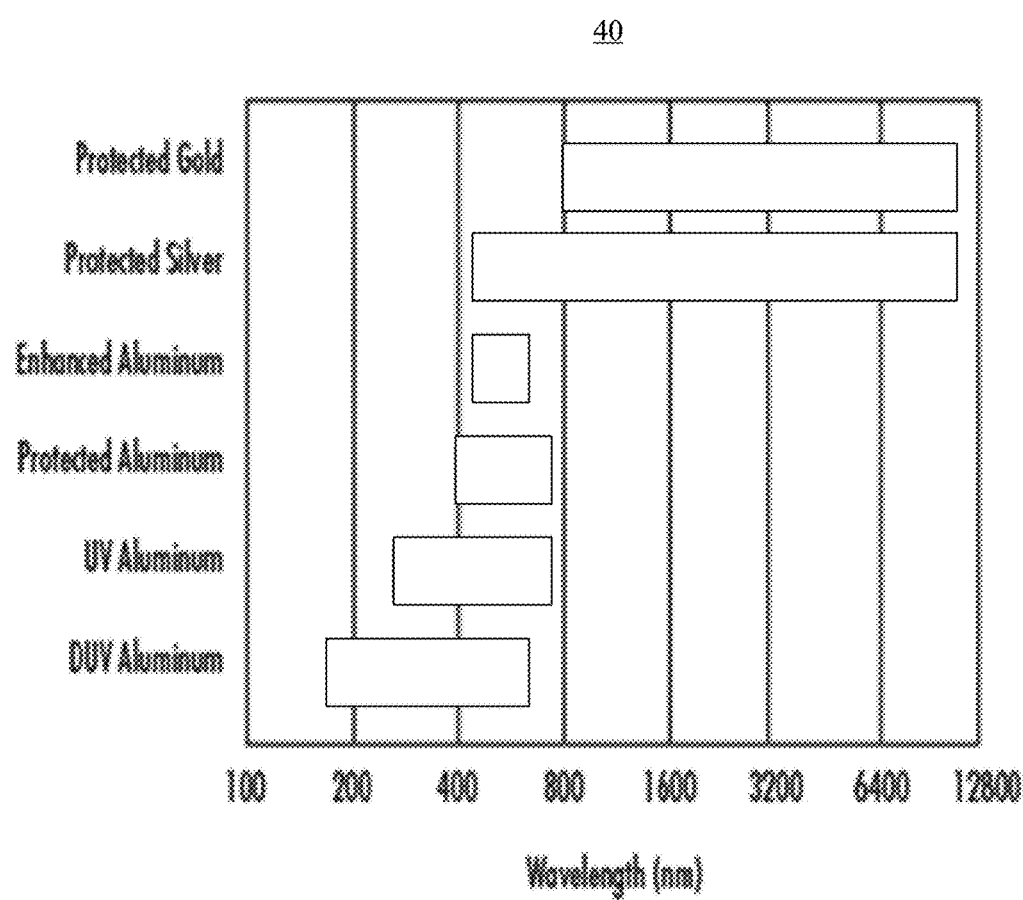
FIG. 3 is a chart of an example comparison of wavelength reflection ranges associated with various mirror coatings according to embodiments.

With continuing reference to FIGS. 1A, 2 and 3, a first mirrored column 36a might be coated with protected gold in order to optimize the ability of the first mirrored column 36a to reflect light in the first wavelength reflection range. Similarly, a second mirrored column 36b might be coated with protected silver in order to optimize the ability of the second mirrored column 36b to reflect light in the second wavelength reflection range, a third mirrored column 36c might be coated with enhanced aluminum in order to optimize the ability of the third mirrored column 36c to reflect light in the third wavelength reflection range, and so forth.

Additionally, each detector 38 (e.g., spectral sensor) may be associated with a specific/unique wavelength detection range. For example, FIG. 4 includes a chart 42 demonstrating that Si-based detectors may be associated with a first wavelength detection range, GaAsP-based detectors may be associated with a second wavelength detection range, GaP-based detectors may be associated with a third wavelength detection range, InGaAs-based detectors may be associated with a fourth wavelength detection range, PbS-based detectors may be associated with a fifth wavelength detection range, InAsSb-based detectors may be associated with a sixth wavelength detection range, MCT-based detectors may be associated with a seventh wavelength detection range, etc., wherein the wavelength detection ranges differ from one another. In addition, FIG. 5 includes a chart 44 demonstrating that the quantum efficiency (QE) may differ across Si-based and various types of InGaAs-based detectors.

Figure 4:
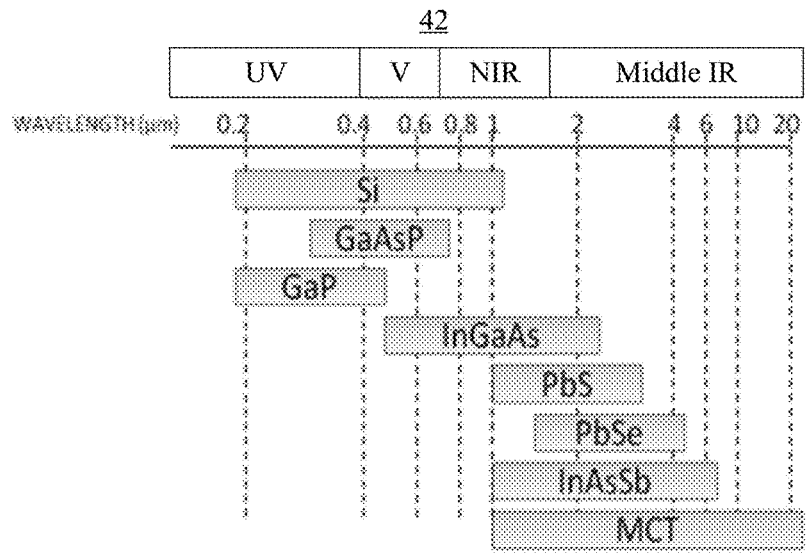
FIG. 4 is a chart of an example comparison of wavelength detection ranges associated with various detectors according to embodiments.
Figure 5:
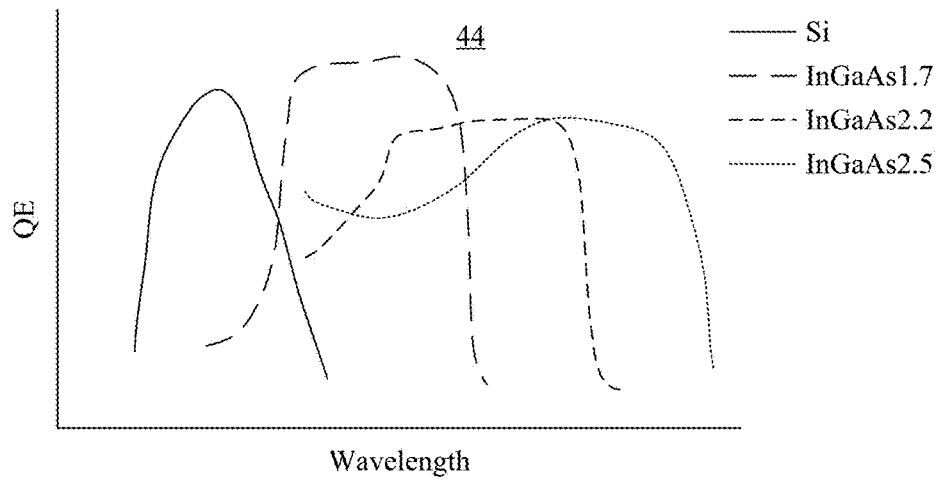
FIG. 5 is a chart of an example comparison of quantum efficiencies of various detectors according to embodiments.

With continuing reference to FIGS. 1A and 4, a first detector 38*a* may include one or more Si-based photodiodes in order to optimize the ability of the first detector 38*a* to measure light in the first wavelength detection range (e.g., 200 nm-1000 nm), a second detector 38*b* may include one or more InGaAs-based sensors in order to optimize the ability of the second detector 38*b* to measure light in the second wavelength detection range (e.g., 1000 nm-2500 nm), and so forth.

Thus, with continuing reference to FIGS. 1A and 2, the illustrated MEMS device 34 positions the mirrored columns 36 to route the first light component 26 and the second light component 28 to the first detector 38*a*. The MEMS device 34 might also position the mirrored columns 36 to route the third light component 30 to the second detector 38*b*. The selective routing may be conducted based on an input signal that corresponds to a particular type of application.

For example, an application to detect bruises in fruit may use the spectrometer apparatus 10 to measure the presence of water. In this regard, the application may take into consideration the fact that the tissue structure of a fruit is destroyed and lacks water at bruised regions. Similarly, the freshness of vegetables may be inferred from water content because fresh vegetables contain relatively large portions of water. Thus, water might be detected at certain wavelength positions—750 nm, 975 nm, 1450 nm, 1950 nm and 2200 nm. In such a case, the apparatus 10 may be automatically configured to measure light in the wavelength range of 750 nm-2200 nm by tilting one or more mirrored columns coated with protected silver to an angle that routes light to both the first detector 38*a* (e.g., capturing 750 nm-1000 nm light) and the second detector 38*b* (e.g., capturing 1000 nm-2200 nm light). The remaining mirrored columns may be tilted to route light away from the plurality of detectors 38.

Figure 1B:
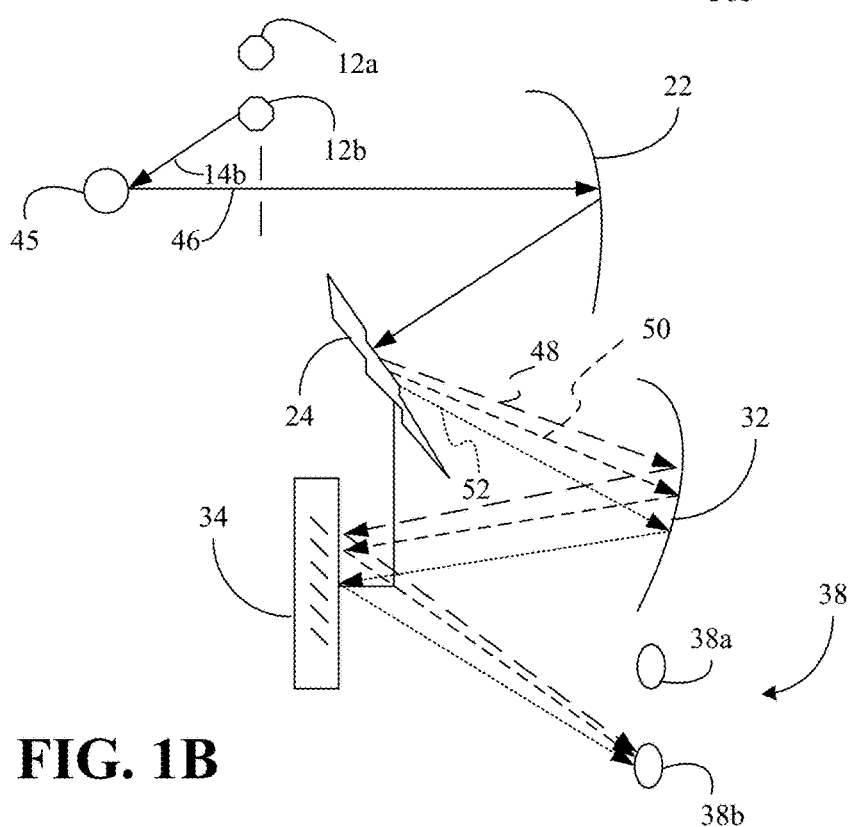

Turning now to FIGS. 1B and 2, another example demonstrates that the first light source 12*a* may be deactivated while the second light source 12*b* remains activated and illuminates an object 45 with the second portion 14*b* (e.g., IR light) of the outbound optical signal. Accordingly, light reflected from the object 45 may be captured as an inbound optical signal 46 by the light collector 20, wherein the wavelength content of the inbound optical signal 46 may be used to identify, characterize and/or classify the object 45. As already noted, the light collector 20 may include a collimation mirror 22 that redirects the inbound optical signal 46 to the diffraction grating element 24. The illustrated diffraction grating element 24 separates/splits the inbound optical signal 46 into light of different wavelengths. For example, the diffraction grating element 24 might split the inbound optical signal 46 into a first light component 48 (e.g., first set of wavelengths), a second light component 50 (e.g., second set of wavelengths) and a third light component 52 (e.g., third set of wavelengths). The focus mirror 32 may in turn reflect the light components 48, 50, 52 to the MEMS device 34.

Thus, the MEMS device 34 may position the mirrored columns 36 to route all three light components 48, 50, 52 to the second detector 38*b*. The illustrated example might therefore correspond to an application that focuses on longer wavelengths where water band information is much stronger. For example, it may be easier to detect water at 1450 nm than at 970 nm. Accordingly, the application may measure reflected light only at 1450 nm, 1950 nm and 2200 nm. In such a case, the apparatus 10 may be automatically configured to tilt one or more mirrored columns coated with protected gold at an angle that routes light to only the second detector 38*b* (e.g., capturing 1000 nm-2200 nm light). Again, the remaining mirrored columns may be tilted to route light away from the plurality of detectors 38. Other wavelengths and materials may be used depending on the circumstances.

Figure 6:
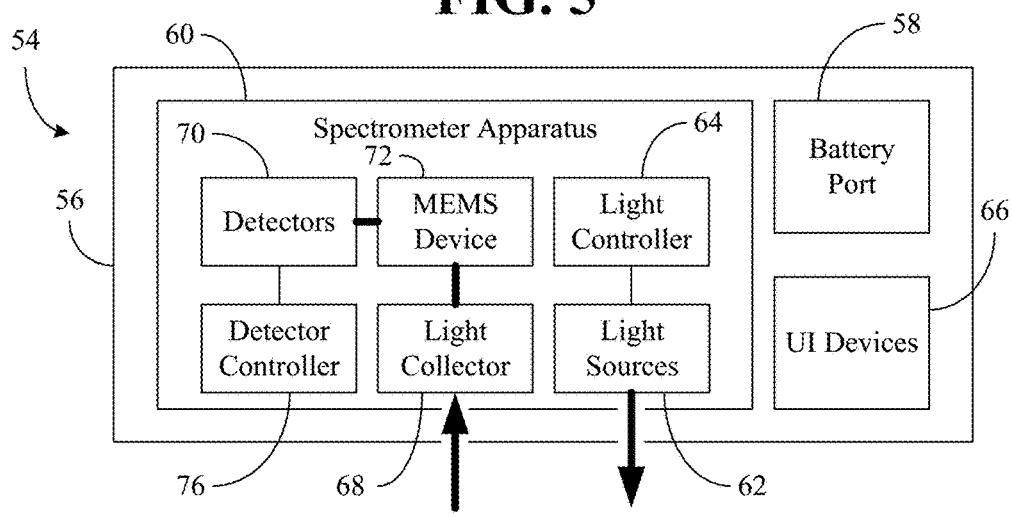
FIG. 6 is a block diagram of an example of a mobile system according to an embodiment.

Turning now to FIG. 6, a mobile device/system 54 is shown, wherein the system 54 includes a housing 56 having a handheld form factor, a battery port 58 to provide power to the system and a spectrometer apparatus 60. The spectrometer apparatus 60 may generally be similar to the spectrometer apparatus 10 (FIGS. 1A, 1B), already discussed. More particularly, the spectrometer apparatus 60 may include a plurality of light sources 62, wherein each light source is associated with a wavelength transmission range that differs from one or more wavelength transmission ranges associated with remaining light sources in the plurality of light sources 62. The plurality of light sources 62 may include, for example, LED arrays, IR light emitters/projectors, etc., or any combination thereof. The illustrated spectrometer apparatus 60 also includes a light controller 64 to activate one or more of the plurality of light sources 62 based on an input signal. The input signal may be obtained from one or more user interface (UI) devices 66 (e.g., keyboard, keypad, touch pad, touch screen, microphone, camera, mouse, etc.).

Additionally, the spectrometer apparatus 60 includes a light collector 68 (e.g., collimation mirror, diffraction grating element, focus mirror) to capture an inbound optical signal and a plurality of detectors 70. Each detector may be associated with a wavelength detection range that differs from one or more wavelength detection ranges associated with one or more remaining detectors in the plurality of detectors 70. The plurality of detectors 70 may include, for example, silicon-based (e.g., complementary metal oxide semiconductor/CMOS) photodiodes, InGaAs detectors, etc., or any combination thereof. As already noted, a MEMS device 72 may include a plurality of mirrored columns, wherein each mirrored column is coated with a material that is associated with a wavelength reflection range that differs from one or more wavelength reflection ranges associated with remaining mirrored columns in the plurality of mirrored columns. The material may include, for example, protected gold, protected silver, enhanced aluminum, protected aluminum, UV aluminum, DUV aluminum, etc., or any combination thereof. Thus, the MEMS device 72 may position the plurality of mirrored columns to route the inbound optical signal to one or more of the plurality of detectors 70 based on the input signal from the UI devices 66, wherein the routing is optimized by virtue of the wavelength-specific coatings.

For example, the UI devices 66 may trigger an application and/or API (application programming interface) to select a transmission/reflection/detection profile and/or template from an XML (extensible markup language) file, database, etc. The selected profile/template may then be used to generate one or more input signals that configure the light controller 64, the MEMS device 72 and a detector controller 76 to measure a specific range of light, which may be a wideband spectrum of light depending on the circumstances. The detector controller 76 may selectively activate one or more of the plurality of detectors 70 based on the input signal(s) in order to conserve power, extend battery life, enhance performance, and so forth. The light controller 64, the MEMS device 72 and the detector controller 76, which may include logic instructions, configurable logic, fixed-functionality logic hardware, etc., or any combination thereof, may be integrated into a shared semiconductor die as a system on chip (SoC). FIG. 7 demonstrates that the housing 56 of the mobile system 54 may have a handheld form factor.

FIG. 8 shows a method 78 of operating a spectrometer apparatus. The method 78 may generally be implemented in a spectrometer apparatus such as, for example, the spectrometer apparatus 10 (FIGS. 1A and 1B) and/or the spectrometer apparatus 60 (FIG. 6), already discussed. More particularly, the method 78 may be implemented in one or more modules as a set of logic instructions stored in a machine- or computer-readable storage medium such as random access memory (RAM), read only memory (ROM), programmable ROM (PROM), firmware (FW), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 78 may be written in any combination of one or more programming languages, including an object oriented programming language such as JAVA, SMALLTALK, C++ or the like and conventional procedural programming languages, such as the "C" programming language or similar programming languages.

Illustrated processing block 80 provides for receiving an input signal. The input signal may be received from a UI device, application, API, etc., or any combination thereof. Block 82 may activate, by a light controller, one or more of a plurality of light sources based on the input signal, wherein each light source is associated with a wavelength transmission range that differs from one or more wavelength transmission ranges associated with one or more remaining light sources in the plurality of light sources. Additionally, one or more of a plurality of detectors may be activated by a detector controller at block 84 based on the input signal, wherein each detector is associated with a wavelength detection range that differs from one or more wavelength detection ranges associated with one or more remaining detectors in the plurality of detectors.

Block 86 may provide for capturing, by a light collector, an inbound signal. Illustrated block 88 positions, by a MEMS device, a plurality of mirrored columns to route the inbound optical signal to one or more of the plurality of detectors based on the input signal. Each mirrored column may be coated with a material that is associated with a wavelength reflection range that differs from one or more wavelength reflection ranges associated with one or more remaining mirrored columns in the plurality of mirrored columns. Illustrated block 90 may analyze the inbound optical signal and generate an analysis result. The analysis result may be output via one or more of the UI devices. Moreover, block 90 may be conducted on the spectrometer apparatus, elsewhere on the mobile device (e.g., host processor), in a cloud computing infrastructure, and so forth.

Block 90 may therefore involve the use of machine learning and/or supervised learning to conduct contactless material discovery.

Additional Notes and Examples

Example 1 may include a spectrometer apparatus comprising a plurality of light sources, wherein each light source is associated with a wavelength transmission range that differs from one or more wavelength transmission ranges associated with one or more remaining light sources in the plurality of light sources, a light controller to activate one or more of the plurality of light sources based on based on an input signal from a user input device, wherein the activated one or more of the plurality of light sources are to generate an outbound optical signal, a light collector to capture an inbound optical signal, a plurality of detectors, wherein each detector is associated with a wavelength detection range that differs from one or more wavelength detection ranges associated with one or more remaining detectors in the plurality of detectors, a detector controller to activate one or more of the plurality of detectors based on the input signal, and a microelectromechanical system (MEMS) device including a plurality of mirrored columns, wherein each mirrored column is coated with a material that is associated with a wavelength reflection range that differs from one or more wavelength reflection ranges associated with one or more remaining mirrored columns in the plurality of mirrored columns, and wherein the MEMS device is to position the plurality of mirrored columns to route the inbound optical signal to one or more of the plurality of detectors based on the input signal.

Example 2 may include the system of Example 1, wherein the plurality of light sources includes one or more of a light emitting diode (LED) array or an infrared (IR) light emitter.

Example 3 may include the system of any one of Examples 1 or 2, wherein the material is selected from a group consisting of protected gold, protected silver, enhanced aluminum, protected aluminum, ultraviolet (UV) aluminum, and deep UV (DUV) aluminum.

Example 4 may include the system of any one of Examples 1 or 2, wherein the plurality of detectors includes one or more of a silicon-based photodiode or an InGaAs detector.

Example 5 may include a mobile system comprising a housing including a handheld form factor, a battery port to provide power to the system, and a spectrometer apparatus including a light collector to capture an inbound optical signal, a plurality of detectors, wherein each detector is associated with a wavelength detection range that differs from one or more wavelength detection ranges associated with one or more remaining detectors in the plurality of detectors, and a microelectromechanical system (MEMS) device including a plurality of mirrored columns, wherein each mirrored column is coated with a material that is associated with a wavelength reflection range that differs from one or more wavelength reflection ranges associated with remaining mirrored columns in the plurality of mirrored columns.

Example 6 may include the system of Example 5, further including a user input device, wherein the MEMS device is to position the plurality of mirrored columns to route the inbound optical signal to one or more of the plurality of detectors based on an input signal from the user interface device.

Example 7 may include the system of Example 6, wherein the spectrometer apparatus further includes a plurality of light sources, wherein each light source is associated with a wavelength transmission range that differs from one or more wavelength transmission ranges associated with remaining light sources in the plurality of light sources, and a light controller to activate one or more of the plurality of light sources based on the input signal, wherein the activated one or more of the plurality of lights sources are to generate an outbound optical signal.

Example 8 may include the apparatus of Example 7, wherein the plurality of light sources includes one or more of a light emitting diode (LED) array or an infrared (IR) light emitter.

Example 9 may include the apparatus of Example 6, wherein the spectrometer apparatus further includes a detector controller to activate one or more of the plurality of detectors based on the input signal.

Example 10 may include the apparatus of any one of Examples 5 to 9, wherein the material is selected from a group consisting of protected gold, protected silver, enhanced aluminum, protected aluminum, ultraviolet (UV) aluminum, and deep UV (DUV) aluminum.

Example 11 may include the apparatus of any one of Examples 5 to 9, wherein the plurality of detectors includes one or more of a silicon-based photodiode or an InGaAs detector.

Example 12 may include a spectrometer apparatus comprising a light collector to capture an inbound optical signal, a plurality of detectors, wherein each detector is associated with a wavelength detection range that differs from one or more wavelength detection ranges associated with one or more remaining detectors in the plurality of detectors, and a microelectromechanical system (MEMS) device including a plurality of mirrored columns, wherein each mirrored column is coated with a material that is associated with a wavelength reflection range that differs from one or more wavelength reflection ranges associated with one or more remaining mirrored columns in the plurality of mirrored columns.

Example 13 may include the apparatus of Example 12, wherein the MEMS device is to position the plurality of mirrored columns to route the inbound optical signal to one or more of the plurality of detectors based on an input signal from a user interface device.

Example 14 may include the apparatus of Example 13, further including a plurality of light sources, wherein each light source is associated with a wavelength transmission range that differs from one or more wavelength transmission ranges associated with one or more remaining light sources in the plurality of light sources, and a light controller to activate one or more of the plurality of light sources based on the input signal, wherein the activated one or more of the plurality of light sources are to generate an outbound optical signal.

Example 15 may include the apparatus of Example 14, wherein the plurality of light sources includes one or more of a light emitting diode (LED) array or an infrared (IR) light emitter.

Example 16 may include the apparatus of Example 13, further including a detector controller to activate one or more of the plurality of detectors based on the input signal.

Example 17 may include the apparatus of any one of Examples 12 to 16, wherein the material is selected from a group consisting of protected gold, protected silver, enhanced aluminum, protected aluminum, ultraviolet (UV) aluminum, and deep UV (DUV) aluminum.

Example 18 may include the apparatus of any one of Examples 12 to 16, wherein the plurality of detectors includes one or more of a silicon-based photodiode or an InGaAs detector.

Example 19 may include a method of operating a spectrometer apparatus, comprising capturing, by a light collector, an inbound optical signal and positioning, by a microelectromechanical system (MEMS) device, a plurality of mirrored columns to route the inbound signal to one or more of a plurality of detectors based on an input signal from a user interface device, wherein each mirrored column is coated with a material that is associated with a wavelength reflection range that differs from one or more wavelength reflection ranges associated with one or more remaining mirrored columns in the plurality of mirrored columns, and wherein each detector is associated with a wavelength detection range that differs from one or more wavelength detection ranges associated with one or more remaining detectors in the plurality of detectors.

Example 20 may include the method of Example 19, further including activating, by a light controller, one or more of a plurality of light sources based on the input signal, wherein each light source is associated with a wavelength transmission range that differs from one or more wavelength transmission ranges associated with one or more remaining light sources in the plurality of light sources, and wherein the activated one or more of the plurality of light sources generate an outbound optical signal.

Example 21 may include the method of any one of Examples 19 or 20, further including activating, by a detector controller, one or more of the plurality of detectors based on the input signal.

Example 22 may include a spectrometer apparatus comprising means for capturing an inbound optical signal, and means for positioning a plurality of mirrored columns to route the inbound signal to one or more of a plurality of detectors based on an input signal from a user interface device, wherein each mirrored column is coated with a material that is associated with a wavelength reflection range that differs from one or more wavelength reflection ranges associated with one or more remaining mirrored columns in the plurality of mirrored columns, and wherein each detector is associated with a wavelength detection range that differs from one or more wavelength detection ranges associated with one or more remaining detectors in the plurality of detectors.

Example 23 may include the apparatus of Example 22, further including means for activating one or more of a plurality of light sources based on the input signal, wherein each light source is associated with a wavelength transmission range that differs from one or more wavelength transmission ranges associated with one or more remaining light sources in the plurality of light sources, and wherein the activated one or more of the plurality of light sources generate an outbound optical signal.

Example 24 may include the apparatus of any one of Examples 22 or 23, further including means for activating one or more of the plurality of detectors based on the input signal.

Thus, technology described herein may enable the ability to measure wide spectrum ranges using a single device within a handheld form factor. Usage scenarios include, but are not limited to, food contamination, medical material detection and other environments.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
a plurality of light sources, wherein each light source is associated with a wavelength transmission range that differs from one or more wavelength transmission ranges associated with one or more remaining light sources in the plurality of light sources;
a light controller to activate one or more of the plurality of light sources based on an input signal from a user input device, wherein the activated one or more of the plurality of light sources are to generate an outbound optical signal;
a light collector to capture an inbound optical signal;
a plurality of detectors, wherein each detector is associated with a wavelength detection range that differs from one or more wavelength detection ranges associated with one or more remaining detectors in the plurality of detectors;
a detector controller to activate one or more of the plurality of detectors based on the input signal; and
a microelectromechanical system (MEMS) device including a plurality of mirrored columns, wherein each mirrored column is coated with a material that is associated with a wavelength reflection range that differs from one or more wavelength reflection ranges associated with one or more remaining mirrored columns in the plurality of mirrored columns, and wherein the MEMS device is to position the plurality of mirrored columns to route the inbound optical signal to one or more of the plurality of detectors based on the input signal.

2. The system of claim 1, wherein the plurality of light sources includes one or more of a light emitting diode (LED) array or an infrared (IR) light emitter.

3. The system of claim 1, wherein the material is selected from a group consisting of protected gold, protected silver, enhanced aluminum, protected aluminum, ultraviolet (UV) aluminum, and deep UV (DUV) aluminum.

4. The system of claim 1, wherein the plurality of detectors includes one or more of a silicon-based photodiode or an InGaAs detector.

5. A system comprising:
a housing including a handheld form factor;
a battery port to provide power to the system; and
a spectrometer apparatus including,
a light collector to capture an inbound optical signal;
a plurality of detectors, wherein each detector is associated with a wavelength detection range that differs from one or more wavelength detection ranges associated with one or more remaining detectors in the plurality of detectors; and
a microelectromechanical system (MEMS) device including a plurality of mirrored columns, wherein each mirrored column is coated with a material that is associated with a wavelength reflection range that differs from one or more wavelength reflection ranges associated with remaining mirrored columns in the plurality of mirrored columns.

6. The system of claim 5, further including a user input device, wherein the MEMS device is to position the plurality of mirrored columns to route the inbound optical signal to one or more of the plurality of detectors based on an input signal from the user interface device.

7. The system of claim 6, wherein the spectrometer apparatus further includes:
a plurality of light sources, wherein each light source is associated with a wavelength transmission range that differs from one or more wavelength transmission ranges associated with remaining light sources in the plurality of light sources; and
a light controller to activate one or more of the plurality of light sources based on the input signal, wherein the activated one or more of the plurality of lights sources are to generate an outbound optical signal.

8. The apparatus of claim 7, wherein the plurality of light sources includes one or more of a light emitting diode (LED) array or an infrared (IR) light emitter.

9. The apparatus of claim 6, wherein the spectrometer apparatus further includes a detector controller to activate one or more of the plurality of detectors based on the input signal.

10. The apparatus of claim 5, wherein the material is selected from a group consisting of protected gold, protected silver, enhanced aluminum, protected aluminum, ultraviolet (UV) aluminum, and deep UV (DUV) aluminum.

11. The apparatus of claim 5, wherein the plurality of detectors includes one or more of a silicon-based photodiode or an InGaAs detector.

12. An apparatus comprising:
a light collector to capture an inbound optical signal;
a plurality of detectors, wherein each detector is associated with a wavelength detection range that differs from one or more wavelength detection ranges associated with one or more remaining detectors in the plurality of detectors; and
a microelectromechanical system (MEMS) device including a plurality of mirrored columns, wherein each mirrored column is coated with a material that is associated with a wavelength reflection range that differs from one or more wavelength reflection ranges associated with one or more remaining mirrored columns in the plurality of mirrored columns.

13. The apparatus of claim 12, wherein the MEMS device is to position the plurality of mirrored columns to route the inbound optical signal to one or more of the plurality of detectors based on an input signal from a user interface device.

14. The apparatus of claim 13, further including:
a plurality of light sources, wherein each light source is associated with a wavelength transmission range that differs from one or more wavelength transmission ranges associated with one or more remaining light sources in the plurality of light sources; and
a light controller to activate one or more of the plurality of light sources based on the input signal, wherein the activated one or more of the plurality of light sources are to generate an outbound optical signal.

15. The apparatus of claim 14, wherein the plurality of light sources includes one or more of a light emitting diode (LED) array or an infrared (IR) light emitter.

16. The apparatus of claim 13, further including a detector controller to activate one or more of the plurality of detectors based on the input signal.

17. The apparatus of claim 12, wherein the material is selected from a group consisting of protected gold, protected silver, enhanced aluminum, protected aluminum, ultraviolet (UV) aluminum, and deep UV (DUV) aluminum.

18. The apparatus of claim 12, wherein the plurality of detectors includes one or more of a silicon-based photodiode or an InGaAs detector.

19. A method comprising:
capturing, by a light collector, an inbound optical signal; and
positioning, by a microelectromechanical system (MEMS) device, a plurality of mirrored columns to route the inbound signal to one or more of a plurality of detectors based on an input signal from a user interface device, wherein each mirrored column is coated with a material that is associated with a wavelength reflection range that differs from one or more wavelength reflection ranges associated with one or more remaining mirrored columns in the plurality of mirrored columns, and wherein each detector is associated with a wavelength detection range that differs from one or more wavelength detection ranges associated with one or more remaining detectors in the plurality of detectors.

20. The method of claim 19, further including activating, by a light controller, one or more of a plurality of light sources based on the input signal, wherein each light source is associated with a wavelength transmission range that differs from one or more wavelength transmission ranges associated with one or more remaining light sources in the plurality of light sources, and wherein the activated one or more of the plurality of light sources generate an outbound optical signal.

21. The method of claim 19, further including activating, by a detector controller, one or more of the plurality of detectors based on the input signal.

* * * * *